Figure 1:
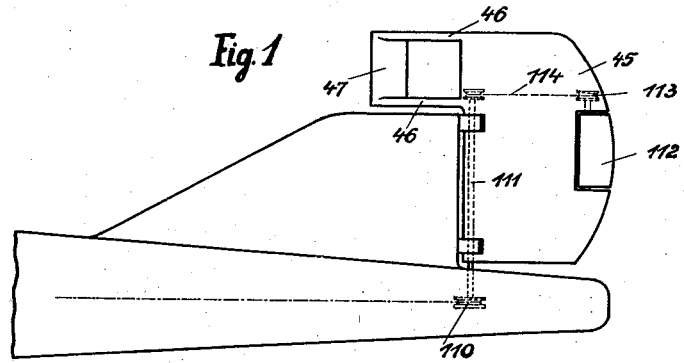

June 19, 1928.

A. FLETTNER

BALANCING OF AIRCRAFT

Filed July 29, 1921

2 Sheets-Sheet 1

Inventor:
Anton Flettner
by
Atty.

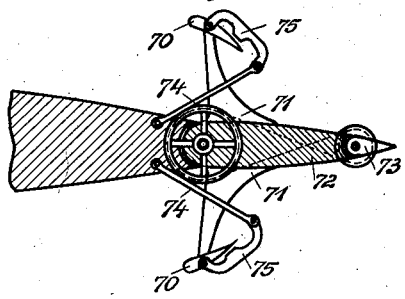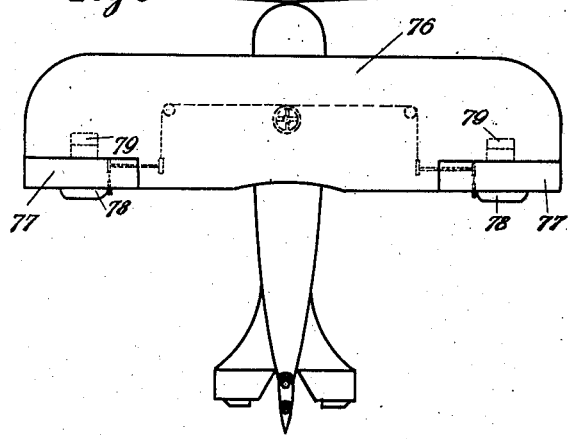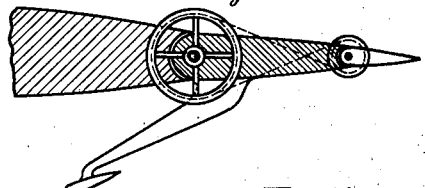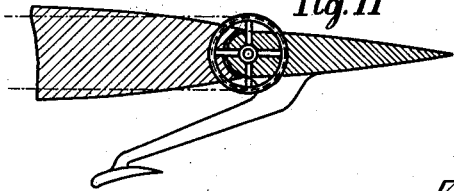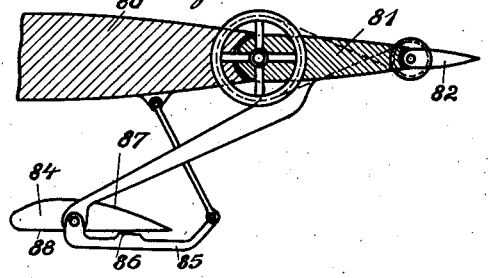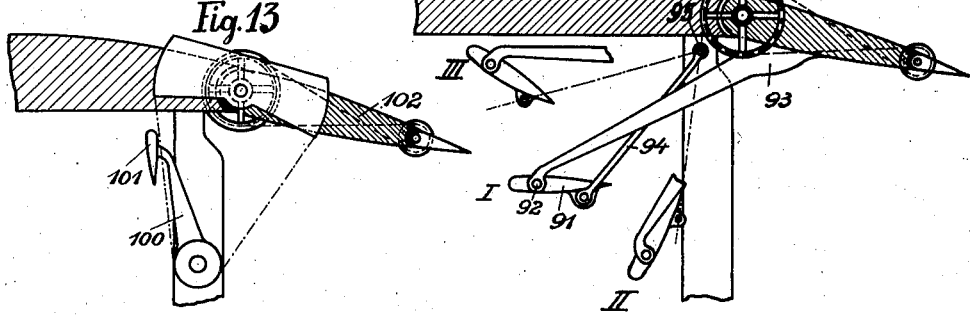

Patented June 19, 1928.

1,674,546

UNITED STATES PATENT OFFICE.

ANTON FLETTNER, OF THE HAGUE, NETHERLANDS.

BALANCING OF AIRCRAFT.

Application filed July 29, 1921, Serial No. 488,392, and in Germany June 16, 1917.

My invention refers to air-craft and more especially to the balancing of the surface pressure acting upon the rudders, and its particular object is to provide novel means for facilitating the operation of such rudders.

It has already been proposed to render the operation of the rudder of air-craft which, particularly in the case of big or giant flying-machines and airships, requires the expenditure of a considerable amount of force, more easy by balancing the surface pressure of the rudder by means of compensating surfaces, arranged in front of the axis of the rudder either within or without the place thereof. Compensating surfaces of this kind have also been adapted to be angularly adjustable relatively to the rudder, in order to fully utilize the wind pressure acting upon them for assisting the manual pressure exerted by the man actuating the rudder.

Compensating devices embodying my invention are illustrated by way of example in the drawings affixed to this specification and forming part thereof.

In the drawings

Figure 2:
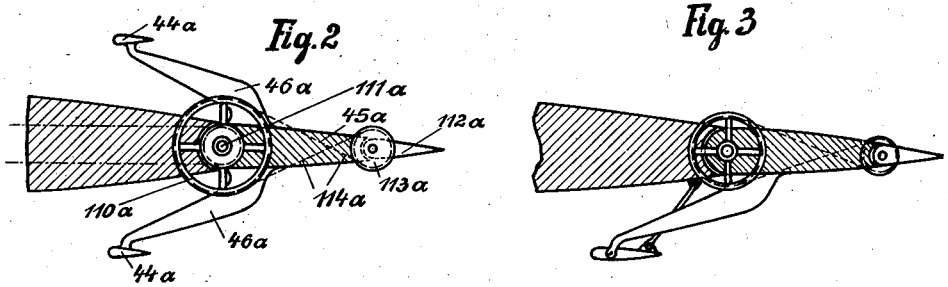
Figure 3:
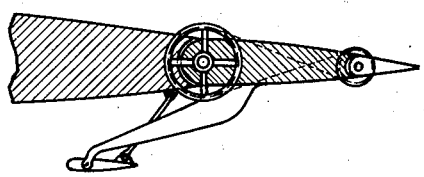
Figure 4:
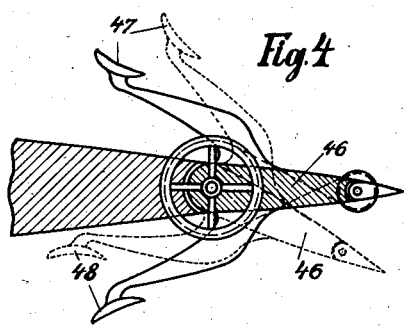
Figure 5:
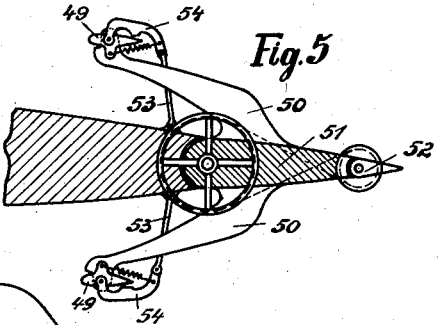
Figure 6:
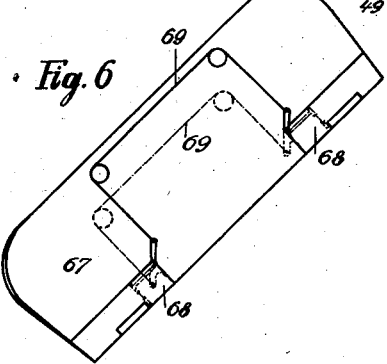

Fig. 1 is an elevation of the tail end of an aircraft with main rudder and pressure surface, Fig. 2 a similar view showing a main rudder with two obliquely arranged lever arms bearing pressure surfaces, Fig. 3 a similar view of a main rudder with a single obliquely arranged lever arm bearing a pressure surface connected by a link to the body of the aircraft, Fig. 4 is a similar view showing a modified form of the arrangement of Fig. 2, Fig. 5 another modified form of the arrangement shown in Fig. 3, the main rudder bearing two oblique lever arms with pressure surfaces, Fig. 6 is a perspective view of a supporting plane provided with a rudder arrangement according to the invention, Fig. 7 illustrates a modification of Fig. 5, Fig. 8 is a plan view of an aircraft, whose supporting plane is provided with warping planes according to this invention, Fig. 9 is an elevation of a main rudder with a single oblique lever arm having a balancing plane fixed thereto, Fig. 10 is a modification of the form shown in Fig. 3, Fig. 11 a modification of the form shown in Fig. 9, and Figs. 12 and 13 are further modifications of the arrangement shown in Fig. 3.

A special method of balancing the main rudder and the auxiliary rudder is shown in Fig. 1. In this arrangement the compensating surface 44 is separated from the rudder 45, though connected thereto by means of a lever arm 46. This arm and surface, or two such arms carrying a surface, may however also project either laterally or obliquely therefrom (Fig. 2). $110^a$ is a wheel mounted on the main rudder spindle $111^a$ and which is adapted to be turned by means of suitable mechanism controlled from a distance. The main rudder is loosely mounted on the shaft of wheel $110^a$, and thus the sheave $113^a$ which is rigidly connected with the auxiliary rudder $112^a$, is turned together with wheel $110^a$ by means of the cable transmission $114^a$. The compensating surfaces may also be movably disposed on the lever arms, and be connected by means of a link with a point on the air craft in such wise, that, on the main rudder executing a motion, the compensating surface will automatically be set at a greater angle (Fig. 3).

While the compensating surface hitherto employed, and which generally constitutes a part of the rudder body, is only provided with a short lever arm, there is in this improved construction, owing to the longer lever arms, obtained the same or even an increased effect by means of a smaller compensating surface.

Besides in the case of a narrow compensating surface the fact of the centre of pressure travelling along this surface is but of minor importance, and in consequence thereof the displacement of the centre of pressure with regard to the rudder as a whole is favorably influenced. Compensating surfaces of this kind may, however, also prove advantageous in the case where no auxiliary rudder at all is employed.

In the arrangement shown in Fig. 4 there are disposed at each side of the main rudder 46 (which is shown in dotted lines in its extreme position), compensating surfaces 47, 48 by means of long, obliquely positioned lever arms. In this construction the one face of the compensating surfaces is so shaped as to present an inner convex surface. As a result, when in the extreme position, the one of these balancing surfaces, say 47, is enabled to offer an exceptionally high resistance to the air current, and will thereby firmly retain the rudder in its extreme position and effectively assist its deflection. The other compensating surface 48 will at the same time be shifted into a position in which it will create a reduced pressure on its convex, and an increased pressure on its concave side. The resultant of the difference in pressure will be such that the second surface, even as the first, will co-operate to maintain the rudder in its extreme position and to render its operation more easy.

However, the compensating surfaces may also be pivoted to their lever arms, and be controlled by links which are adapted to engage, on the one hand, the air craft body or the main rudder, and, on the other, the compensating surface itself, or else an abutment or stop to the action of which it is subject. Fig. 5 discloses a form of execution of this kind, in the case of which the compensating surface 49 is arranged on a lever arm 50 of the main rudder, on the rotation of which rudder, effected either directly or by aid of an auxiliary rudder 52, the said surface 49 will be carried along in one direction by a stop 54 arranged on the guide member 53, while when said rudder moves in the opposite direction it remains lying in a line parallel to the air current.

In the case of winding or twisting surfaces or lateral transverse balancing planes, which as a rule are operated simultaneously though in a contrary direction, there will result a very simple balancing arrangement for the weights on the two planes being connected with each other by means of cables. An arrangement of this kind is shown in Fig. 6, in which 67 denotes the supporting plane and 68 the two winding surfaces. Above and below the supporting plane the two winding surfaces are connected to each other by cables 69 suitably run across rollers. On the rudders being displaced in an opposite direction, relatively to each other the weight of the two rudders will be balanced in any position which they may assume, since the mutual displacement of the rudders is not followed by any alteration in the length of the cables but merely by a shifting of their position.

The compensating surfaces, already disclosed in Fig. 5, which are pivoted to the arms of levers, are arranged, in accordance with the construction shown in Fig. 7 at either side of the main rudder. The compensating surfaces are arranged at the lever arms 71 of the main rudder 72, and, on this latter being oscillated either directly or by means of the auxiliary rudder 73, are taken along in one direction by means of stops 75 fixed to the links 74, while, when the main rudder moves in the contrary direction, they remain lying in a direction parallel to the air current.

In the structure shown in Fig. 7, the two compensating surfaces act on a common main control surface. However, in the case of air craft, control surfaces are also frequently arranged in such a manner that several uniformly acting rudders will result, this, for example, by twisting or winding flaps being arranged at each of the supporting surface and being so coupled to one another that on the one flap executing a motion in one direction, the other flap will effect a motion in the contrary sense.

In the case of winding flaps of this kind, the steering arrangement may be such as is illustrated in Fig. 7, in the case of which there are provided for each winding flap two compensating surfaces. In accordance with my invention, the arrangement is in so far simplified in that for each winding flap there is provided but one compensating surface, of which the one as the rudder moves, will come to act in one sense, while the other will simultaneously move in the contrary direction. This was already explained in connection with the structure shown in Fig. 5. On the compensating surfaces being coupled to each other in the manner aforesaid, then, on each movement executed by the winding flaps, but one compensating surface will always enter into action.

Fig. 8 discloses diagrammatically a plan view of a supporting plane 76 with its winding flaps 77. At the winding flaps there are arranged auxiliary rudders 78, while the numeral 79 denotes the compensating surfaces.

In the case of certain arrangements, the auxiliary surface is so disposed that in proportion as the inclination of the main rudder increases, its own inclination will attain a greater extent.

This arrangement is still further improved subject to my invention, by the auxiliary surface in the course of its downward movement attaining a greater angle of inclination than when executing the upward movement. This is obtained by the means disclosed in the foregoing description, say, for example, by the movable auxiliary surface being set in correspondence with the movement of the main rudder by means of suitable links, or else by the auxiliary surface, which may be either movable or stationary, being from the outset arranged in such a manner that, when in its normal position, it will be disposed obliquely to the air current, as shown in Fig. 9.

By the arrangement in accordance with my invention, the advantage is secured that when managing a curve, the lowered auxiliary surface disposed to the inside of the curve, will offer a greater resistance to the air, while the auxiliary surface lying to the outside of the curve will assist the steering action.

The arrangement shown in the drawing will make it directly obvious that when managing a curve in the air, the particular compensating surface which is disposed to the inside of the curve will offer a considerably greater resistance than the one disposed on the outside of said curve. It follows herefrom that by these means the movement of the air craft within the curve is facilitated. And vice versa in cases where it is desired to pass out of the curve and to continue the flight in a straight direction, the balancing plane disposed on the outside of the curve will develop to a greater degree a braking force than the plane disposed on the inside of the curve.

Now this braking action may be intensified by curving the outside faces of the compensating surface differently, as disclosed in Fig. 10. In this figure the numeral 80 denotes the supporting surface to which the winding surface or main rudder 81, along with the auxiliary rudder 82 is pivoted. The compensating surface 84 is pivoted to the lever 83, and there is also attached thereto the lever 85 with the projection 86. The two outside faces 87, 88 of the compensating surface possess a different curvature, so that, for example, in the arrangement shown in the drawing, in the case of which the compensating surface is disposed underneath the main rudder, the upper peripheral surface will be decidedly convex, while the lower surface will run practically in a straight line. If, however, on the lever 85 being raised, the compensating surface be suspended loosely within the driving wind, then its resistance will be but slight. On the lever 85 being lowered as the winding surface 89 is being raised, then the projection 86 will force the curved face 87 forward. The air resistance is substantially increased by reason of the flattened shape of the underside of the compensating surface; as a matter of fact the said resistance will rapidly augment as the angle of inclination increases, as compared to an arrangement in which both outside surfaces possess the same curvature, as that for example denoted by the numeral 87.

The application of the arrangement is not confined to the particular case hereinbefore described, but may be employed in all cases where it is intended that the compensating surface shall assume different positions as the main rudder is being displaced (see, for example, Fig. 11). Now while, in the case of a displacement of the compensating surface against the air current in which as the deflection in the downward direction increases the resistance shall be augmented, the asymmetrical profile formation of the compensating surface, as chosen in this instance, will increase the resistance as the angle of inclination grows bigger, the said profile formation will considerably augment the elevating force of the compensating surface, in the manner of a supporting surface, when the said compensating surface is being oscillated upwards.

If the compensating surface be fixed to an oblique lever arm at a distance from the main rudder, there is the possibility, by suitably selecting the obliquity of the lever arm, as also of the links required for setting the compensating surface, of not only utilizing to the fullest extent the wind pressure acting on the said surface, but also that the moment acting on the main surface will at a given wind pressure attain its maximum value.

An arrangement in accordance with this invention is disclosed in Fig. 12, in which 91 indicates the balancing plane which is pivotally fixed to the rim 92 of the lever 93 disposed at an incline to the main rudder surface. The compensating surface is in addition pivoted by means of the link 94 to a fixed point of the air craft (pin of spindle 95). The normal position of the compensating surface is denoted by I, while the numeral II denotes the position assumed when the surface deflects outward, and III indicates the position assumed when it deflects inward. When the compensating surface takes up the position marked II, which corresponds to the maximum deflection, both the compensating surface as also the lever arm carrying it, are disposed approximately, or even entirely, in the same angle against the direction of flight. This angle is so chosen that the pressure created by the air current will come to act entirely on the compensating surface, and further, that the moment created by the compensating surface on the main rudder by aid of the wind pressure will be utilized to the fullest extent. These results are obtained in connection with the position selected for the lever and the compensating surface, by the fact that the maximum wind pressure is directed perpendicularly on to the lever arm. The angle of maximum deflection of the compensating surface and the lever arm opposed to the direction of flight will differ according to the shape and size of the compensating surface employed. The most favorable results will be obtained, as may be readily ascertained on the basis of well known conditions, by means of an angle lying midway between 35 and 55°.

The maximum inward deflection of the compensating surface is illustrated by the position marked III. In this position the angle of inclination against the direction of flight is smaller than the angle of inclination which it attains when effecting the maximum outward deflection, although the main rudder, even when the compensating surface effects its widest movement, will deflect to either side to the same extent.

The differences required in the deflection of the compensating surface, when the main rudder effects a deflection to either side, may be readily obtained by a suitable selection of the fixed point 95 on the air craft, to which the compensating surface is to be pivoted by aid of the link 94.

The arrangement shown in Fig. 13 affords the possibility of considerably reducing the area of the compensating surfaces. This is obtained by the lever 100 of the compensating surface 101 being so connected to the main rudder 102 that, on the main rudder being displaced, it will describe a large angle (viz, up to 90°).

I claim:

1. In air craft in combination, a rudder, means for deflecting said rudder, a lever arm attached to said rudder and extending in front of the axis of said rudder, a pressure surface movably attached to said lever arm and a link connecting said surface to a fixed point on the aircraft.

2. In air craft in combination, a rudder, means for deflecting said rudder, a plurality of levers attached to said rudder and extending in front of the axis of said rudder, a pressure surface attached to each lever arm and means inserted between said rudder and said surfaces for alternately rendering one surface operative and inoperative according as the rudder is deflected to one or the other side.

3. In aircraft in combination, a body, a rudder, a lever arm attached to said rudder and extending in front of the axis of said rudder, a pressure surface attached to said lever arm and means inserted between said body and said surface, said means being adapted to be governed by the deflection of said rudder whereby said surface can assume a position at a greater angle to the direction of flight, when being deflected downwards, than in the case, when it is deflected upwards.

In testimony whereof I affix my signature.

ANTON FLETTNER.